(12) United States Patent
Shigeta et al.

(10) Patent No.: US 9,100,688 B2
(45) Date of Patent: Aug. 4, 2015

(54) RECEPTION APPARATUS, RECEPTION METHOD AND EXTERNAL APPARATUS LINKING SYSTEM

(75) Inventors: Chihoko Shigeta, Kunitachi (JP);
Hiroyuki Aizu, Yokohama (JP);
Michihiro Fukushima, Fuchu (JP);
Noriya Sakamoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 142 days.

(21) Appl. No.: 13/489,645

(22) Filed: Jun. 6, 2012

(65) Prior Publication Data

US 2013/0050059 A1 Feb. 28, 2013

(30) Foreign Application Priority Data

Aug. 31, 2011 (JP) ................................. 2011-190143

(51) Int. Cl.
G09G 5/00 (2006.01)
H04N 21/435 (2011.01)
H04N 21/41 (2011.01)

(52) U.S. Cl.
CPC ......... H04N 21/435 (2013.01); H04N 21/4122 (2013.01); H04N 21/4126 (2013.01)

(58) Field of Classification Search
USPC ........ 725/32; 345/1.1, 1.2, 204; 348/725, 468
See application file for complete search history.

(56) References Cited

U.S. PATENT DOCUMENTS

| 6,349,410 | B1 | 2/2002 | Lortz |
| 2001/0040532 | A1* | 11/2001 | Yasuda ........................... 345/1.1 |
| 2002/0133823 | A1 | 9/2002 | Sekimoto et al. |
| 2004/0055018 | A1* | 3/2004 | Stone ............................ 725/113 |
| 2005/0110909 | A1 | 5/2005 | Staunton et al. |
| 2006/0214873 | A1* | 9/2006 | Park et al. ...................... 345/1.1 |
| 2008/0209492 | A1 | 8/2008 | Matsuura et al. |
| 2008/0284907 | A1 | 11/2008 | Chiao |
| 2009/0128447 | A1 | 5/2009 | Yoshikawa et al. |
| 2009/0172724 | A1* | 7/2009 | Ergen et al. ...................... 725/32 |
| 2010/0013997 | A1 | 1/2010 | Hwang |
| 2010/0077309 | A1 | 3/2010 | Miyada |
| 2011/0069081 | A1 | 3/2011 | Lee et al. |
| 2012/0086859 | A1 | 4/2012 | Kawade |

FOREIGN PATENT DOCUMENTS

| EP | 2088775 | 8/2009 |
| EP | 2309375 | 4/2011 |
| GB | 2349769 | 11/2000 |
| JP | 09-214446 | 8/1997 |
| JP | 2000-138915 | 5/2000 |

(Continued)

OTHER PUBLICATIONS

Japanese Office Action dated Jul. 31, 2012 for Japanese Application No. 2011-190143 filed Aug. 31, 2011.

(Continued)

*Primary Examiner* — Shaheda Abdin

(74) *Attorney, Agent, or Firm* — Knobbe Martens Olson & Bear LLP

(57) ABSTRACT

In at least one embodiment, a reception apparatus includes a discrimination data receiver configured to receive discrimination data that is transmitted from outside the reception apparatus and that has been associated with display information to be displayed; and an output controller configured to control output of the display information to two or more display screens according to the discrimination data.

7 Claims, 9 Drawing Sheets

(56) References Cited

FOREIGN PATENT DOCUMENTS

| | | |
|---|---|---|
| JP | 2000-312349 | 11/2000 |
| JP | 2000-341623 | 12/2000 |
| JP | 2003-506784 | 2/2003 |
| JP | 2004-194259 | 7/2004 |
| JP | 2007-251418 | 9/2007 |
| JP | 2008-099313 | 4/2008 |
| JP | 2009-130397 | 6/2009 |
| JP | 2010-081262 | 4/2010 |
| JP | 2010-141878 | 6/2010 |
| JP | 2010-239360 | 10/2010 |
| JP | 2010-258849 | 11/2010 |
| KR | 2004-0019797 | 3/2004 |
| WO | WO 03/085965 | 10/2003 |
| WO | WO 2009/038596 | 3/2009 |
| WO | WO 2010/037104 | 4/2010 |

OTHER PUBLICATIONS

Japanese Office Action dated Dec. 4, 2012 for Japanese Application No. 2011-190143 filed Aug. 31, 2011.
European Search Report dated Jan. 18, 2013 for European Application No. 12170120.5.
Foina, Aislan G., et al., "How a cell phone can change dramatically the way we watch tv", Eurocon 2009, Eurocon '09. IEEE, IEEE, Piscataway, NJ, May 18, 2009, pp. 1265-1271.
Japan Patent Office, Notification of Reasons for Refusal in JP Application No. 2014-019783, Jan. 6, 2015.

\* cited by examiner

FIG. 4A

| CHANNEL | | 1 | 2 | ... | n |
|---|---|---|---|---|---|
| DISPLAY DATA 1 | FILENAME | aaa.txt | bbb.txt | | ... |
| | DISPLAY DESTINATION | FIRST SCREEN | FIRST SCREEN (MERGABLE WITH SECOND SCREEN) | | ... |
| DISPLAY DATA 2 | FILENAME | ccc.txt | ddd.txt | | ... |
| | DISPLAY DESTINATION | SECOND SCREEN | SECOND SCREEN (MERGABLE WITH FIRST SCREEN) | | ... |
| DISPLAY DATA n | FILENAME | ... | ... | | ... |
| | DISPLAY DESTINATION | ... | ... | | ... |

FIG. 4B

| CHANNEL | | 1 | 2 | ... | n |
|---|---|---|---|---|---|
| DISPLAY DATA 1 | ADDRESS | http://www.aaa.... | http://www.bbb.... | | ... |
| | DISPLAY DESTINATION | FIRST SCREEN | FIRST SCREEN (MERGABLE WITH SECOND SCREEN) | | ... |
| DISPLAY DATA 2 | FILENAME | http://www.ccc.... | http://www.ddd.... | | ... |
| | DISPLAY DESTINATION | SECOND SCREEN | SECOND SCREEN (MERGABLE WITH FIRST SCREEN) | | ... |
| DISPLAY DATA n | ADDRESS | ... | ... | | ... |
| | DISPLAY DESTINATION | ... | ... | | ... |

```
<html>
<head>
    <title>sample title</title>
</head>
<body>
    <h1>hello</h1>         —P1        P2
    <iframe>src=http://www.bbb.co.jp
    width= "500" height= "500"
    </iframe>
</body>
```

```
<html>
<head>
    <title>sample title</title>
</head>
<body>
    <h1>hello</h1>
</body>
```

```
<html>
<head>
</head>
<body>
    <iframe>src=http://www.bbb.co.jp
    width= "500" height= "500"
    </iframe>
</body>
``` http://www.bbb.co.jp

RECEPTION APPARATUS, RECEPTION METHOD AND EXTERNAL APPARATUS LINKING SYSTEM

CROSS-REFERENCE TO RELATED APPLICATION(S)

This application claims priority from Japanese Patent Application No. 2011-190143 filed on Aug. 31, 2011, the entire contents of which are incorporated herein by reference.

FIELD

Embodiments described herein relate generally to a reception apparatus, a reception method and an external apparatus linking system.

BACKGROUND

Sometimes, together with the picture data of a broad cast program, the related information data thereof is received, so that both of the program picture and the related information are displayed on a display screen.

For example, when a user views a screen other than the screen displaying the program picture, it may be preferable that appropriate related information is displayed on the other screen.

BRIEF DESCRIPTION OF DRAWINGS

A general architecture that implements the various features of the present invention will now be described with reference to the drawings. The drawings and the associated descriptions are provided to illustrate embodiments and not to limit the scope of the present invention.

FIG. 4A and FIG. 4B illustrate data structures of data received by the reception apparatus.

DETAILED DESCRIPTION

In general, one embodiment provides a reception apparatus including: a discrimination data receiver configured to receive discrimination data that is transmitted from outside the reception apparatus and that has been associated with display information to be displayed; and an output controller configured to control output of the display information to two or more display screens according to the discrimination data.

An embodiment will be described with reference to the drawings.

Figure 1:
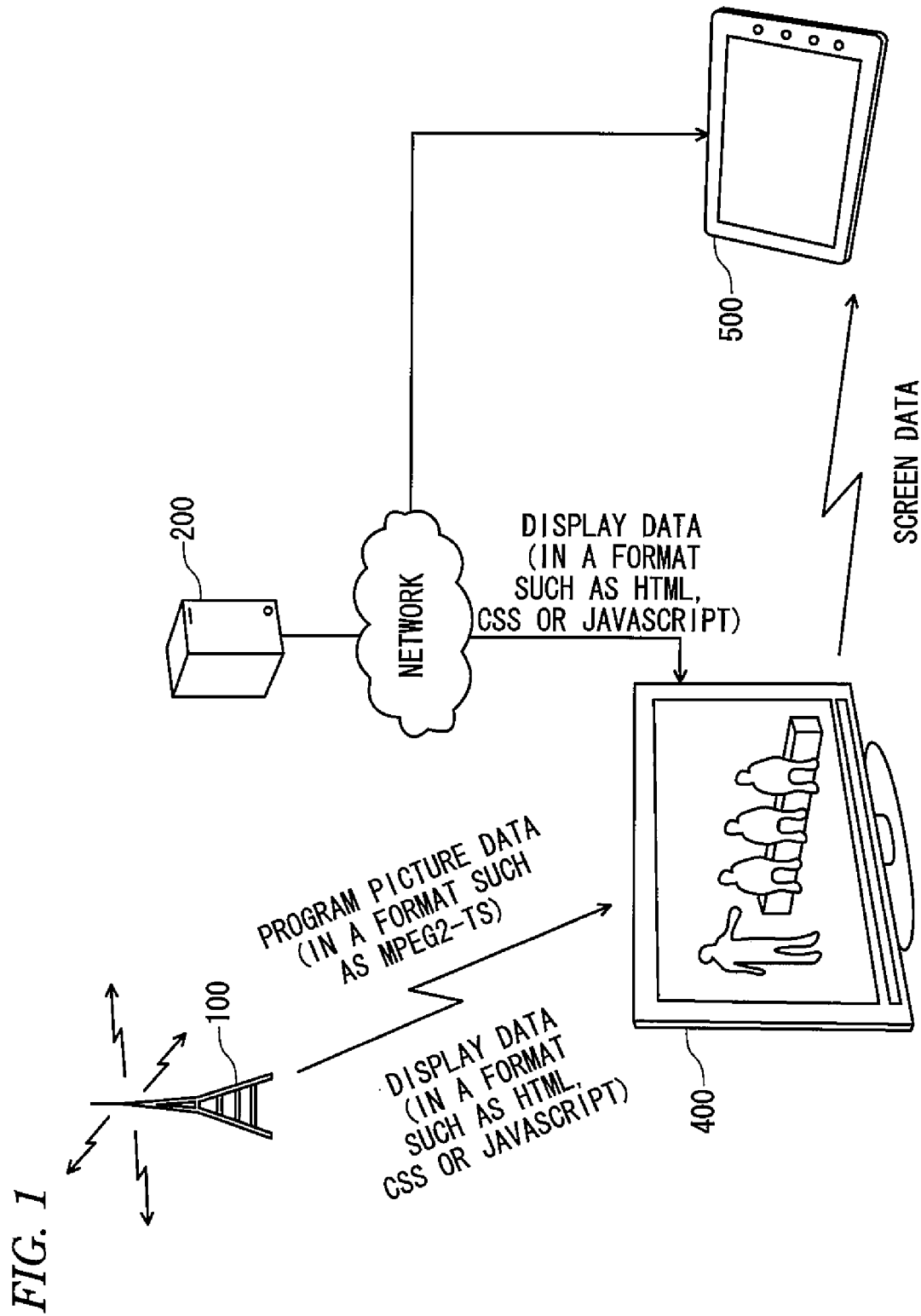
FIG. 1 illustrates a usage condition of a reception apparatus of an embodiment.

FIG. 1 illustrates a usage condition of a reception apparatus according to the embodiment. In the embodiment, the reception apparatus is implemented as a television set 400, for example. For example, a broadcast station 100 transmits broadcast signals of programs, such as picture data for each channel, as a MPEG2-TS format stream. The broadcast station 100 also transmits display data for each channel, depicted in for example HTML, CSS and/or JavaScript (Trademark) format.

A server 200 transmits display data for each channel transmitted by the broadcast station 100. In the embodiment, the "display data" may be: data that is superimposed on a broadcast signal by the broadcast station 100; data transmitted via a network from the server 200; or data transmitted from both sources. For example, the "display data" include information related to broadcast program content (such as cast information, related program information, language subtitles not carried by the MPEG-TS broadcast signal) and additional picture data capable of increasing picture quality by being superimposed on the picture data from the broadcast signal. In the embodiment, while the "display data" means data for displaying a picture such as characters or an image on a display screen, it may be considered as a type of picture data.

Examples of streams superimposed on a broadcast signal include an Elementary Stream (ES) for picture and audio respectively, and Program Specific Information (PSI)/Service Information (SI) related to the ES. The PSI/SI includes for example output device data. The output device data includes a discriminator indicating which screen the display data transmitted from the broadcast station 100 or the server 200 should be displayed on, and a discriminator indicating which screen the picture data of the TS carrying output device data as packets should be displayed on. When plural picture streams are superimposed on the TS carrying output device data as packets, the output device data may include a discriminator indicating the screen for displaying each of the respective picture streams.

For example, as the output device data, an output data table (Output Device Information Table (OIT)) in the PSI/SI may be made, or descriptors such as "output to reception apparatus (first screen)"/"output to external apparatus (second screen)"/"output to both reception apparatus and external apparatus" may be defined in preexisting tables, such as an Application Information Table (AIT) as defined in 102 809 of Digital Video Broadcasting (DVB). Two examples of output device data are described later with reference to FIG. 4A and FIG. 4B.

On receipt of picture data and display data, for example from the broadcast station 100 and the server 200, the television set 400 determines whether the data is first screen data or second screen data based on the output device data. The television set 400 displays first screen data and outputs second screen data to an external apparatus (a data terminal 500 in the embodiment). When a discriminator for an output screen is included in the output device data of the TS for the channel superimposed on the broadcast signal, the television set 400 uses the discriminator to separate out picture data and display data for use on the television set 400 itself and on an external apparatus, so as to display on the respective apparatus. The television set 400 uses the discrimination data included in a broadcast signal or signal from the server 200 to separate program picture data and related information data (display information) of a broadcast program, and displays these separated data on the first screen and/or the second screen.

In the embodiment, the first screen corresponds to the display screen of the apparatus (television set 400) receiving the broadcast signal, and the second screen corresponds to an external apparatus (data terminal) capable of communicating with the apparatus. However, the correspondence is not limited thereto. For example, the display screen of the television set 400 may be split into two regions, and these regions may be designated as the first screen and the second screen.

Figure 2:
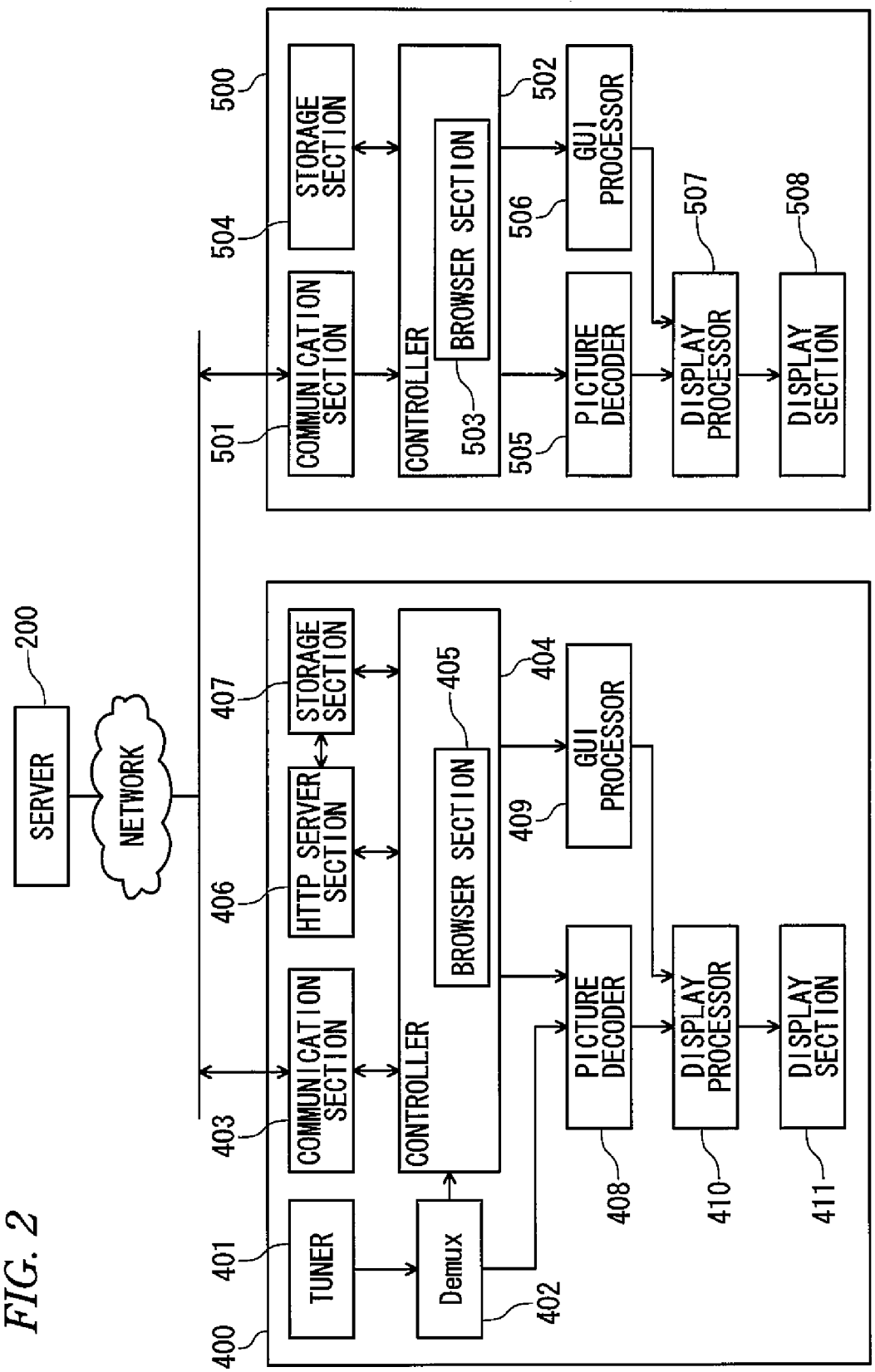
FIG. 2 illustrates system configurations of the reception apparatus and a data terminal of the embodiment.

FIG. 2 illustrates system configurations of a television set 400 and a data terminal 500. In the embodiment, the television set 400 and the data terminal 500 are connectable together for communication, for example by direct communication or communication through a home network.

The television set 400 includes a tuner 401, a de-multiplexer 402, a communication section 403, a controller 404, a browser section 405, an HTTP server section 406, a storage section 407, a picture decoder 408, a GIU processor 409, a display processor 410 and a display section 411.

The tuner 401 is a reception section for receiving a broadcast signal. The de-multiplexer 402 is a separation section for separating each type of data superimposed on the received broadcast signal. The de-multiplexer 402 outputs picture data superimposed in the broadcast signal to the picture decoder 408, outputs audio data to an audio decoder (not shown) and outputs output device data and display data to the controller 404.

When output device data is included in the broadcast signal, or when a discriminator related to the output device for picture data (display destination screen) is included in the output device data, the de-multiplexer 402 may outputs picture data to a module based on the discriminator. Namely, the de-multiplexer 402 may outputs the sub picture stream to the controller 404 when a main picture stream and a sub picture stream (such as sub-titles) are included in the TS of the broadcast signal, and the discriminator indicating display on the second screen is associated with the sub picture stream. The sub picture stream is thereby transmitted to the data terminal 500 in such cases under the control of the controller 404.

The communication section 403 executes communication with an external apparatus. The communication section 403 may receive display data from the server 200. On receipt of display data, the communication section 403 outputs the display data to the controller 404. When the communication section 403 receives picture data and display data and an address from the controller 404, the communication section 403 transmits the data to the address destination.

On receipt of output device data, picture data and display data, the controller 404 controls such that the data is output to a screen based on the output device data. Namely, when the data is first screen data, the controller 404 outputs the picture data and display data expressed in the output device data as a picture to the picture decoder 408, or to the GIU processor 409. However, when the data is second screen data, the controller 404 transmits the picture data and display data expressed in the output device data from the communication section 403 to the data terminal 500.

When a specific discriminator is included in input picture data and display data, the controller 404 may output the discriminator to a specific screen. Hence, though the output device data referred to above is not input, which screen is to be used for the data is determined based on the specific discriminator included in the picture data and the display data. The output destination screen is then selected/determined.

The controller 404 includes the browser section 405. The browser section 405 performs analysis/processing of file data described in HTML, CSS or JavaScript (registered trademark) format. The browser section 405 extracts and separates the display data for each screen when display data for both the first screen and the second screen is contained in a single data file. When an internet address of a picture to be displayed is contained in first screen display data, the browser section 405 acquires the data from the indicated address by employing the communication section 403. The browser section 405 then outputs the acquired data to either the picture decoder 408 or the GIU processor 409.

The controller 404 also selects the apparatus for displaying the second screen picture data and display data. For example, the controller 404 may select a preregistered apparatus as the transmission destination for the picture data and display data, or may display a settings screen for selecting a transmission apparatus destination, with the apparatus then selected according to user operation. The controller 404 outputs the address of the apparatus selected as the transmission destination to the communication section 403, together with the picture data and display data.

The HTTP server section 406 has a general webserver function. The HTTP server section 406 outputs data stored in the storage section 407 to the browser section 405 in response to requests from the browser section 405.

The storage section 407 stores picture data and display data. An explanation of storing picture data and display data is given later, with reference to FIG. 8.

The picture decoder 408 decodes picture data that has been input from the de-multiplexer 402 and the browser section 405. The GIU processor 409 generates display data in a format the display processor 410 is capable of processing from the display data described in HTML, CSS or JavaScript (registered trademark) format input from the controller 404.

The display processor 410 superimposes the picture data decoded by the picture decoder 408 and the display data generated by the GIU processor 409, and converts the superimposed data into a picture signal of a format displayable on the display section 411. The display section 411 uses the picture signal to display a picture.

The data terminal 500 includes a communication section 501, a controller 502, a browser section 503, a storage section 504, a picture decoder 505, a GUI processor 506, a display processor 507 and a display section 508.

The communication section 501 receives the second screen picture data and display data transmitted from the television set 400 and outputs the second screen picture data and display data to the controller 502.

The controller 502 is equipped with the browser section 503. When second screen display data in HTML, CSS or JavaScript (registered trademark) format has been input, the controller 502 outputs the display data to the GUI processor 506 and also performs analysis/processing on the contents of the data. When an interne address of a picture to be displayed is contained in the display data, the controller 502 employs the communication section 501 to acquire the data from the address given and then outputs the acquired data to the picture decoder 505 or the GUI processor 506. When a picture data stream has been input from the communication section 501, the controller 502 outputs the data to the picture decoder 505.

The storage section 504 stores picture data and display data. Explanation of the storage function is given with reference to FIG. 10.

The picture decoder 505 decodes picture data that has been input from the controller 502. The GUI processor 506 generates display data of a format the display processor 507 is capable of processing from the display data of HTML, CSS or JavaScript (registered trademark) format that was input from the controller 502.

The display processor 507 superimposes the picture data decoded by the picture decoder 505 and the display data generated by the GUI processor 506, and converts the superimposed data into a picture signal of a format displayable on the display section 508. The display section 508 then employs the picture signal to display a picture.

Figure 3:
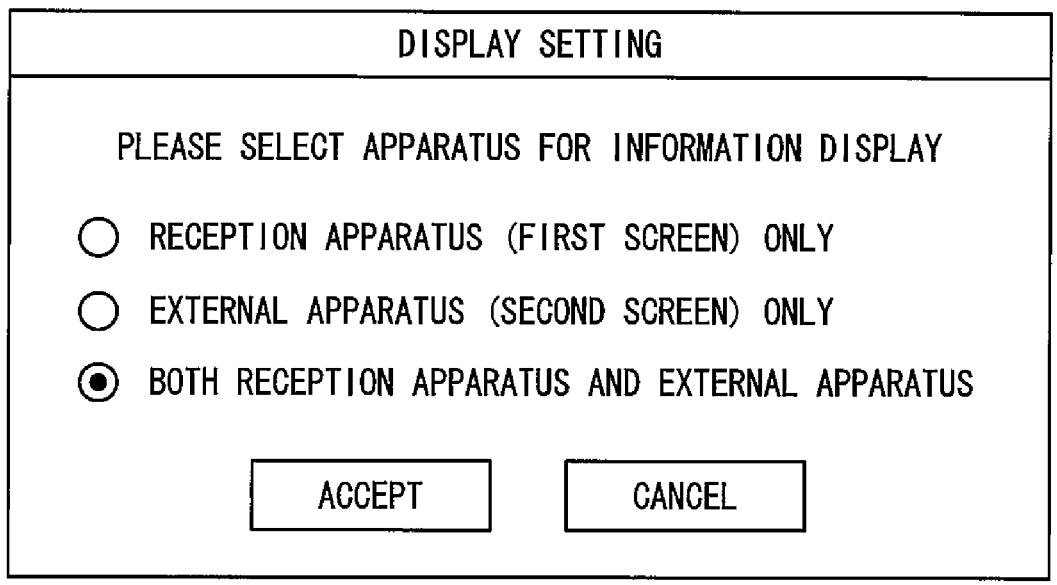
FIG. 3 illustrates a display settings screen displayed on the reception apparatus.

FIG. 3 illustrates a display settings screen to be displayed on the television set 400. The controller 404 of the television set 400 causes the settings screen to be displayed on the display section 411. The controller 404 then selects the screen (apparatus) for displaying picture data and display data to be received from a broadcast signal or network according to user operation input in response to the settings screen.

In the screen of FIG. 3, it is possible to select a setting among "RECEPTION APPARATUS (FIRST SCREEN) ONLY", "EXTERNAL APPARATUS (SECOND SCREEN) ONLY" and "BOTH RECEPTION APPARATUS AND EXTERNAL APPARATUS". "RECEPTION APPARATUS (FIRST SCREEN) ONLY" refers to a setting for displaying picture data and display data only on the apparatus (the television set 400) receiving the broadcast signal. "EXTERNAL APPARATUS (SECOND SCREEN) ONLY" refers to a setting for displaying picture data and display data only on an external apparatus (the data terminal 500) connected in communication with the television set. "BOTH RECEPTION APPARATUS AND EXTERNAL APPARATUS" refers to displaying the picture data and display data on both apparatuses (on both screens).

FIG. 4A and FIG. 4B illustrate data structures of output device data the broadcast station 100 superimposes on a broadcast signal. In FIG. 4A, display data aaa.txt, bbb.txt, ccc.txt and ddd.txt are shown with associations to display screens and channels. Such display data may be superimposed on the respective broadcast signals, and in such cases the television set 400 receives the display data with the tuner 401. Alternatively, the television set 400 may store an address for acquiring display data for each channel, with display data then being received from the address when a given channel is selected.

Such text data may be expressed for example in HTML, CSS or JavaScript (registered trademark) format. However, the file format of the display data is not limited to text format. For data other than text data, such as a picture stream, the output destination screen may be similarly determined based on the output device data, and the other data then output according to the determination result. Namely, in the output device data of FIG. 4A, data relating to the screen for displaying a picture stream may be associated for each program stream superimposed on the broadcast signal.

aaa.txt and ccc.txt respectively indicate display data related to Channel 1, with aaa.txt being first screen display data and ccc.txt being second screen display data. Namely, when the display setting for the display data of the television set 400 is "BOTH RECEPTION APPARATUS AND EXTERNAL APPARATUS" of FIG. 3, the television set 400 displays an image based on aaa.txt on its own display screen, and transmits the ccc.txt to the data terminal 500 for displaying an image based on the ccc.txt.

When the display setting of the television set 400 is "RECEPTION APPARATUS (FIRST SCREEN) ONLY" of FIG. 3, the television set 400 displays an image based on the aaa.txt on its own display screen and does not transmit the ccc.txt to the data terminal 500. When the display setting of the television set 400 is "EXTERNAL APPARATUS (SECOND SCREEN) ONLY" of FIG. 3, the television set 400 transmits the ccc.txt to the data terminal 500 for displaying an image based on the ccc.txt data and does not display an image based on the aaa.txt on its own display screen.

bbb.txt and ddd.txt are both display data relating to Channel 2, with the bbb.txt being first screen display data and the ddd.txt second screen display data. The bbb.txt and the ddd.txt are different from the aaa.txt and the ccc.txt, and both are capable of displaying on a separate screen. Therefore, when for example the display setting of the television set 400 is "RECEPTION APPARATUS (FIRST SCREEN) ONLY" of FIG. 3, an image based on the bbb.txt and an image based on the ddd.txt can be combined and displayed on the television set 400. The controller 404 may not always combine and display the image of the bbb.txt with the ddd.txt, and for example, may set whether or not to combine and display according to user operational input.

In FIG. 4B, the output device data is, in contrast to FIG. 4A, stored with an address and not a display data file name. When output device data of FIG. 4B is input, the controller 404 extracts the address of display data of the channel for the currently selected image for display, and employs the communication section 403 to acquire data from the address. The controller 404 then displays the acquired data on the screen(s) based on the output device data and based on the display setting of the display settings screen of FIG. 3.

The contents of the output device data illustrated in FIG. 4A and FIG. 4B may be refreshed, such as with new file names and display destinations, for each set of display data, for example every time the program changes, or every time a program scene changes for a single channel. The broadcast station 100 may transmit appropriate display data that differs for each transmitted program or program scene.

Figure 5A:
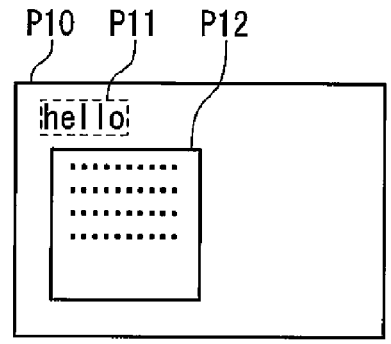
FIG. 5A to FIG. 5D illustrate data structures of data received by the reception apparatus and screens displayed on the reception apparatus and/or the data terminal.

FIG. 5A to FIG. 5D illustrate data structures of display data. In FIG. 4A and FIG. 4B, cases where the first screen and the second screen display data for different files are exemplified. On the other hand, as shown in FIG. 5A, the first screen display data and the second screen display data may be depicted in a single file.

The file of the display data illustrated in FIG. 5A contains first screen data P1 and second screen data P2. A screen such as screen P10 is displayed when the file is displayed on a screen with a normal browser. In this case, a first screen image P11 and a second screen image P12 are disposed on the screen P10. The second screen image P12 is an image displaying the contents of a web page designated by the address contained in the second screen data P2.

In the embodiment, the controller 404 identifies for example an iframe element as a discriminator of second screen display data. Namely, when character strings <iframe> and </iframe> are included indicating that the input data is an inline frame, then the portion sandwiched between the <iframe> and </iframe> is discriminated to be second screen display data, and the first screen and second screen display data are separated on this basis.

Figure 5B:
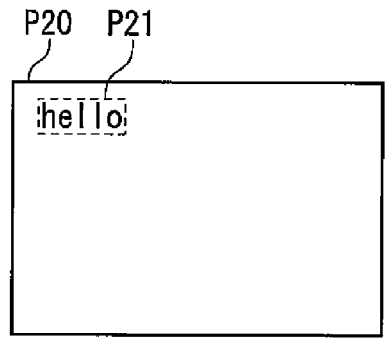

FIG. 5B illustrates a data structure of first screen display data that has been separated out by the controller 404, and a screen displayed employing the display data. The inline frame has been removed in the display data of FIG. 5B, such that the display screen employing the display data is as shown in screen P20.

Figure 5C:
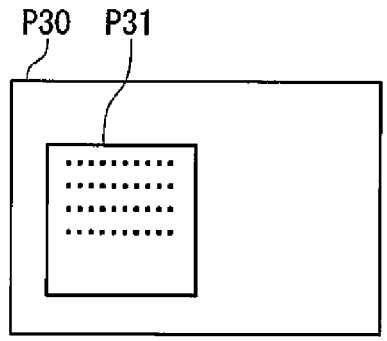

FIG. 5C illustrates a data structure of second screen display data generated by the controller 404, and a screen displayed employing the display data. The controller 404 generates new HTML text using the inline frame separated and extracted from the display data of FIG. 5A, and sets the generated new HTML text as the second screen display data. The contents of a web page are displayed within frame image P31 on screen P30 since such details as the size of the frame for the inline frame have been designated in the display data.

Figure 5D:
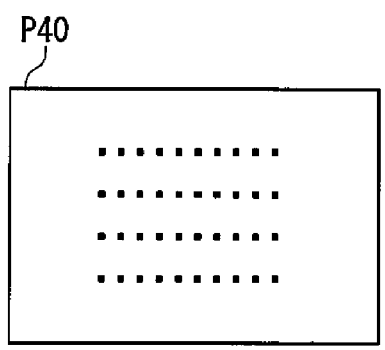

FIG. 5D illustrates another data structure of second screen display data generated by the controller 404, and a screen for display employing the display data. When there is an src attribute present the inline frame separated and extracted from the display data of FIG. 5A, the controller 404 extracts an interne address from the character string following on from the character string "src=" and sets the address as the second screen display data. The contents of the web page designated by the address are displayed on the whole of screen P40 for the display screen employing the thus set display data. Which of the display modes of FIG. 5C or FIG. 5D is displayed can be set based on user operational input.

In such languages as HTML, sometimes messaging (data transfer) is performed through an event system between a script program on the inline frame inside and a script program on the new node side. If in such cases the controller 404 simply separates out the inline frame then messaging can no longer be performed. For example, in order to compensate for the messaging between a first screen browser section 405 and a second screen browser section 503, the controller 404 may generate and embed script (JavaScript (Trademark)) in HTML for generating the first screen browser section 405 and in HTML for generating the second screen browser section 503.

Figure 6A:
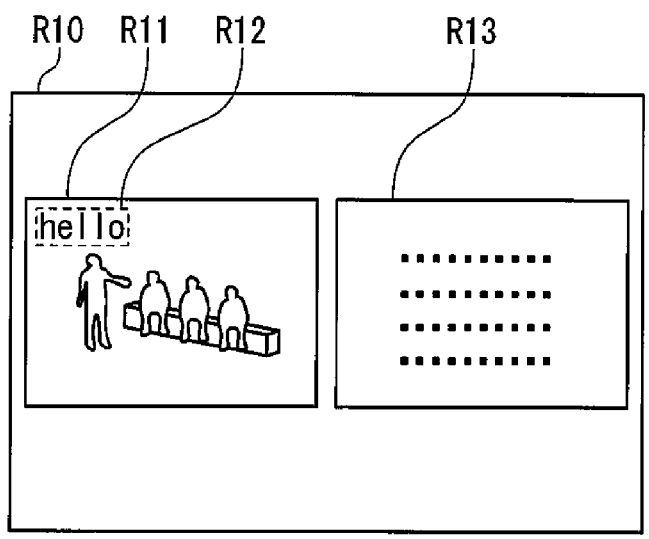
FIG. 6A to FIG. 6C illustrate screens displayed on the reception apparatus.
Figure 6B:
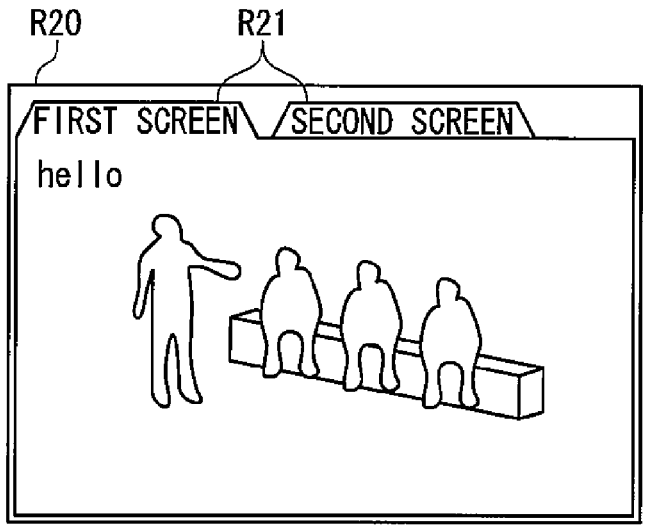
Figure 6C:
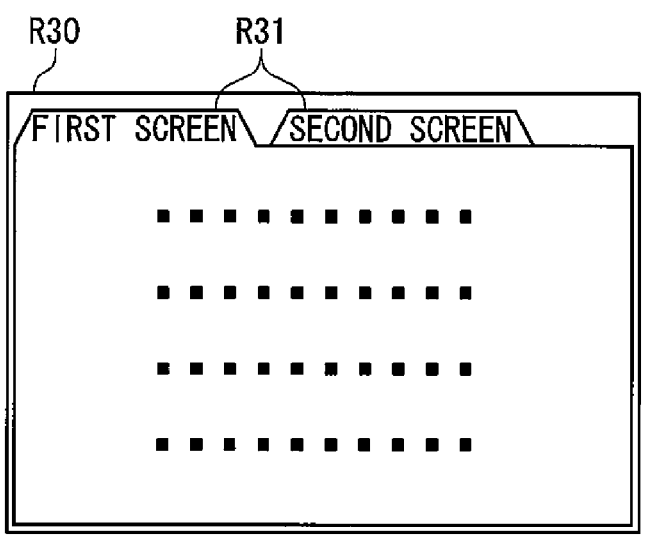

FIG. 6A to FIG. 6C illustrate display screens that have been set on the display section 411 of the television set 400 for the first screen and the second screen. A first region R11 and a second region R13 are disposed on a screen R10 illustrated in FIG. 6A. A program picture and first screen display data R12 are displayed in the first region R11. Second screen display data is displayed in the second region R13. The television set 400 may not always display the program picture in the first region R11, and the program picture may be displayed in the second region R13. Namely, the television set 400 can be made to display a program picture on the screen indicated by output device data contained in PSUSI data.

Display is switchable between the first screen and the second screen on a screen R20 and a screen R30 illustrated in FIG. 6B and FIG. 6C, respectively, and switching images R21 and R31 are displayed for switching between the first screen and the second screen.

In FIG. 6A to FIG. 6C, the display data shown in FIG. 5B is employed as the first screen display data and the display data shown in FIG. 5D is employed as the second screen display data. However, other formats may be employed as the format of the display data employed for displaying the first screen and the second screen. Hence, the display data of FIG. 5A may be employed for display on the second screen, for example, and a program picture alone displayed on the first screen. Instead of the format of FIG. 5D being employed as the second screen display data, the data of the format of FIG. 5C is employed to display an image on the second screen based on data acquired from the address of http://www.bbb.co.jp. Which format of display data to employ for display can be set based on user operation.

Figure 7:
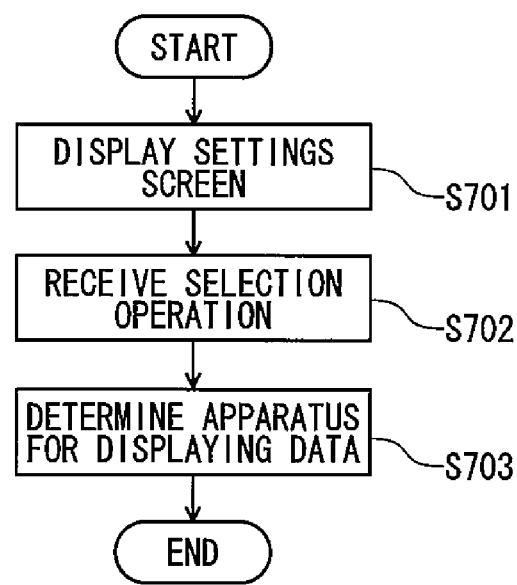
FIG. 7 illustrates setting processing by the reception apparatus.

FIG. 7 illustrates processing related to display setting by the television set 400.

The display section 411 first displays a display settings screen as illustrated in FIG. 3 (S701). The controller 404 then receives user operational input to a not-illustrated operation section (S702). The controller 404 sets the device (screen) for displaying a picture of the display data based on such operational input (S703), thereby completing the process.

Figure 8:
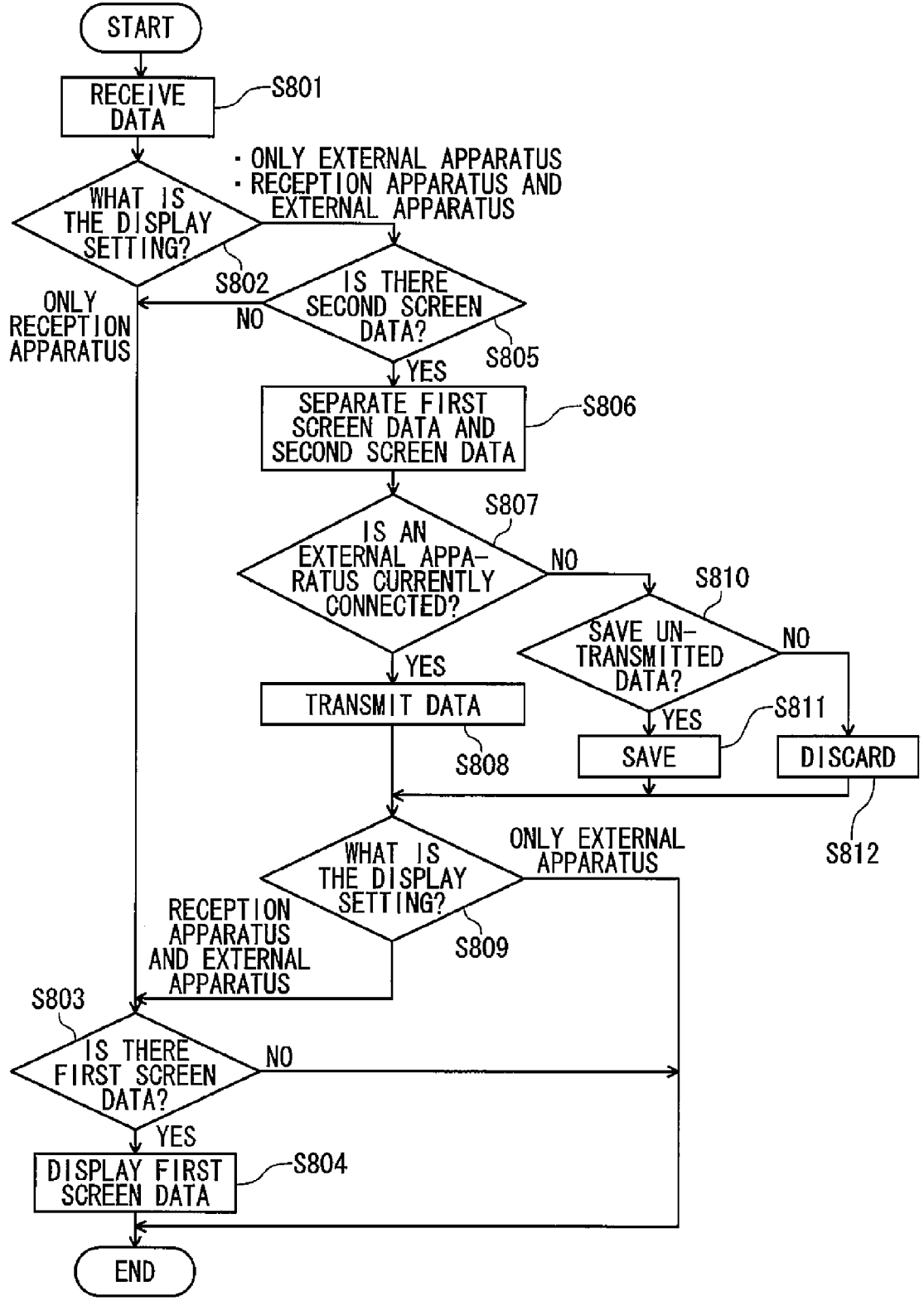
FIG. 8 illustrates data reception processing by the reception apparatus.

FIG. 8 illustrates processing related to picture data and display data reception, and picture display by the television set 400.

The television set 400 first receives data (display information) to be displayed, namely receives picture data and display data (S801). For example, the television set 400 may receive with the tuner 401 data superimposed on a broadcast signal, or to receive with the communication section 403 data stored in the server 200. Then the television set 400 displays the first screen data (S804) when both "RECEPTION APPARATUS (FIRST SCREEN) ONLY" of FIG. 3 is set as the display setting on the television set 400 itself (S802: "RECEPTION APPARATUS ONLY") and the data received at S801 contains first screen data (S803: Yes). However, the processing of FIG. 8 is ended when it is determined that there is no first screen data contained at S803 (S803: No).

When the television set 400 determines at S802 that either "EXTERNAL APPARATUS (SECOND SCREEN) ONLY" or "BOTH RECEPTION APPARATUS AND EXTERNAL APPARATUS" of FIG. 3 is set as the display setting (S802: "EXTERNAL APPARATUS ONLY" or "BOTH RECEPTION APPARATUS AND EXTERNAL APPARATUS"), and when the data received at S801 contains second screen data (S805: Yes), the television set 400 then splits the received data into first screen data and second screen data (S806). In this example, as shown in FIG. 5A to FIG. 5D, when for example a portion enclosed by an iframe element is separated from a single file for use as the second screen display data there is some concern that the layout of the first screen display data from which the iframe element has been removed might be corrupted. Therefore, the controller 404 may arrange the layout by inserting for example a div element for the removed iframe element.

The television set 400 then determines whether or not an external apparatus is connected in communication with the television set 400 itself (S807). For example, the television set 400 may determine whether or not a pre-registered external apparatus is connected. When an external apparatus is connected (S807: Yes), the television set 400 transmits the second screen data to the external apparatus (the data terminal 500) (S808). The television set 400 executes the processing of S803 when the display setting is "BOTH RECEPTION APPARATUS AND EXTERNAL APPARATUS", and ends the processing when the display setting is "EXTERNAL APPARATUS (SECOND SCREEN) ONLY".

However, at S807, when an external apparatus is not connected (S807: No), the television set 400 then selects whether or not to save the data it is unable to transmit to an external apparatus (S810). The television set 400 may determine whether or not to save the data by, for example, setting in advance by user operation, and by then selecting according to the setting. When the data is to be saved (S810: Yes), the television set 400 stores the second screen data in the storage section 407 (S811). However, the second screen data is discarded when data is not to be saved (S812). The television set 400 may transmit the stored data to an external apparatus when the external apparatus has subsequently been connected to the television set 400 after the second screen data was stored.

At S808, the television set 400 may transmit screen data for use on the second screen to the data terminal 500 via a not-illustrated communication sever when, for example, there is no preregistered external apparatus connected. Hence, when the data terminal 500 is currently located outside of a home network range and located outside of a direct communication range with the television set 400, but is located within a network range such as a mobile communication network, it is desirable to enable the second screen data to be transmitted through a communication server of a mobile communication network. However, since communication charges are sometimes incurred it is preferable in such cases to reduce the amount of data such as by using an address format such as shown in FIG. 5D as the format of data for transmission. In such cases the television set 400 transmits the second screen data and the address of the data terminal 500 to the communication server address.

Although processing to separate display data received from outside a television set, such as from the broadcast station 100 and/or the server 200 and processing to display the display data on the television set 400 and/or the data terminal 500 are exemplified, the television set 400 may separate data stored within the television set 400 itself and then separately display the separated data. Namely, when display data is designated by an address as shown in FIG. 4B, this address may be an address designating a location inside the television set 400. In such cases the controller 404 transmits the address to the HTTP server section 406 and acquires display data in response to the transmission.

Figure 9:
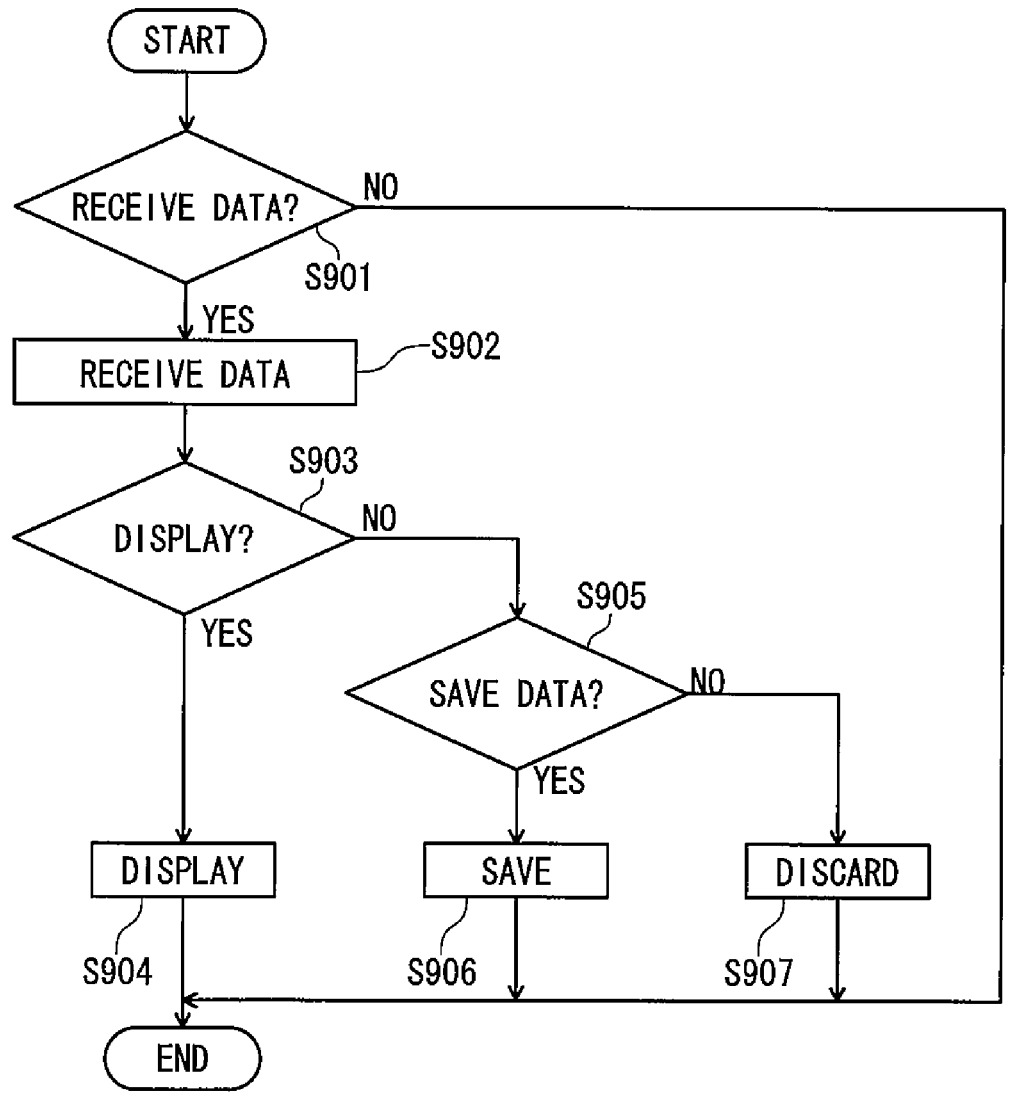
FIG. 9 illustrates data reception processing by the data terminal.

Processing related to receiving display data and picture display with the data terminal 500, as shown in FIG. 9, will be explained.

The data terminal 500 first determines whether or not to receive data (display information) such as picture data and display data transmitted from the television set 400 (S901). The data terminal 500 may be configured such that determination is performed by dialogue with a user and receipt of operational input at the time when data has been transmitted from the television set 400, or may be configured by presetting whether or not to receive data.

On receipt of the data (S902) the data terminal 500 then determines whether or not to display the data (S903). When determined to perform display (S903: Yes), the data terminal 500 displays the data (S904). However, when it has been determined that display is not to be performed (S903: No), the data terminal 500 then determines whether or not to save the received data (S905). When determined to save the data (S905: Yes), the data terminal 500 stores the received data in the storage section 504 (S906), however the received data is discarded (S907) when saving is not to be performed.

In the embodiment, a television set 400 having a display screen is exemplified as the reception apparatus, however the reception apparatus itself may not have a display screen. Namely, the reception apparatus of the embodiment may be implemented for example by an apparatus such as a set top box that receives a broadcast signal and/or a network signal, and outputs a picture signal to an external display apparatus. The reception apparatus in such cases may for example execute the processing of the above embodiment wherein the display screen of the external display apparatus itself is employed as the first screen, and the display screen of the external apparatus (the data terminal 500) connected by a communication connection is employed as the second screen.

While the embodiment is explained above, it is provided merely as an example and do not limit the scope of the invention. It is also possible to implement various other modifications to the embodiment, and various omissions, substitutions and changes can be implemented within the scope of the invention. The embodiment and modifications thereof will fall within the scope of claims and their equivalents.

The invention claimed is:

1. A reception apparatus comprising:
a display screen;
a receiver configured to receive a broadcast signal that is transmitted from an outside of the reception apparatus, the broadcast signal corresponding to a single channel having a set of:
content data;
display data or address data which includes an address specifying the display data, the display data being different from the content data; and
discrimination data; and
an output controller configured to output the content data and the display data in a display configuration depending on the discrimination data, the display configuration from a plurality of display configurations comprising
a first display configuration, wherein the content data and the display data are outputted to a first screen being the display screen of the reception apparatus,
a second display configuration, wherein the content data is outputted to the first screen and the display data is outputted to a second screen being an external display screen of an external apparatus, and
a third display configuration, wherein the content data and the display data are outputted to the first screen and the display data is outputted to the second screen.

2. The reception apparatus of claim 1,
wherein the output controller is configured to further control output of the content data to the first screen and/or the second screen according to the discrimination data.

3. The reception apparatus of claim 1, further comprising:
a transmitter configured to transmit the display data or the address data to the second screen.

4. The reception apparatus of claim 1,
wherein the broadcast signal is broadcasted or transmitted through a network.

5. The reception apparatus of claim 1, further comprising:
a storage module configured to store the display data or the address data.

6. A reception method for a reception apparatus, the method comprising:
receiving discrimination data that is transmitted from outside the reception apparatus and has been associated with display information to be displayed,
wherein the discrimination data corresponds to a single channel having a set of
content data; and
display data, the display data being different from the content data; and
outputting the content data and the display data in a display configuration depending on the discrimination data, the display configuration from a plurality of display configurations comprising
a first display configuration, wherein the content data and the display data are outputted to a first screen being a display screen of the reception apparatus,
a second display configuration, wherein the content data is outputted to the first screen and the display data is outputted to a second screen being external display screen of an external apparatus, and
a third display configuration, wherein the content data and the display data are outputted to the first screen and the display data is outputted to the second screen.

7. An external apparatus linking system, comprising:
a first apparatus; and
a second apparatus,
wherein the first apparatus comprises
a receiver configured to receive a broadcast signal that is transmitted from an outside of the first apparatus, the broadcast signal corresponding to a single channel having a set of:
content data;
display data, the display data being different from the program content data; and
discrimination data;

an output controller configured to output the content data and the display data depending on the discrimination data, the display configuration from a plurality of display configurations comprising,
- a first display configuration, wherein the content data and the display data are outputted to a first screen being a display screen of the first apparatus,
- a second display configuration, wherein the content data is outputted to the first screen and the display data is outputted to a second screen being an external display screen of an external apparatus, and
- a third display configuration, wherein the content data and the display data are outputted to the first screen and the display data is outputted to the second screen, and an output module configured to output the content data and the display data in response to control from the output controller.

* * * * *